United States Patent [19]

Burton et al.

[11] Patent Number: 5,528,710

[45] Date of Patent: Jun. 18, 1996

[54] OPTICAL SWITCHING DEVICE WITH PASSIVE INPUT AND OUTPUT STAGES AND ACTIVE AMPLIFIER IN A MATRIX STAGE

[75] Inventors: Julie Burton, Woodbridge; Philip J. Fiddyment; Michael J. Robertson, both of Ipswich, all of England

[73] Assignee: British Telecommunications Public Limited Corporation, London, England

[21] Appl. No.: 331,604

[22] PCT Filed: May 5, 1993

[86] PCT No.: PCT/GB93/00923

§ 371 Date: Dec. 12, 1994

§ 102(e) Date: Dec. 12, 1994

[87] PCT Pub. No.: WO93/22708

PCT Pub. Date: Nov. 11, 1993

[30] Foreign Application Priority Data

May 5, 1992 [GB] United Kingdom .................... 9209662
Dec. 31, 1992 [EP] European Pat. Off. ............... 92311876

[51] Int. Cl.⁶ ..................................................... G02B 6/35
[52] U.S. Cl. ............................................. 385/16; 385/17
[58] Field of Search .................................. 385/16, 17, 15, 385/18, 19, 44, 45, 20; 257/98

[56] References Cited

U.S. PATENT DOCUMENTS 5,050,951  9/1991  Caron et al. .................. 385/17
5,255,332  10/1993  Welch et al. ................. 385/17
5,283,844  2/1994  Rice et al. ..................... 385/17

FOREIGN PATENT DOCUMENTS 2227845A  2/1989  United Kingdom .

OTHER PUBLICATIONS

"Monolithically Integrated Optical Gate 2X2 Matrix Switch Using GaAs/AlGaAs Multiple Quantum Well Structure", A. Ajisawa, et al., Electronics Letters, Oct. 8, 1987, vol. 23, No. 21, pp. 1121–1122.

"Monolithically Integrated 2X2 InGaAsP/InP Laser Amplifier Gate Switch Arrays", M. Janson, et al., ECOC 1991, pp.1–4.

"Monolithically Integrated 2X2 InGaAsP/InP Laser Amplifier Gate Switch Arrays", M. Janson, et al., Electronics Letters, Oct. 9, 1992, vol. 28, No. 8, pp. 776–778.

Primary Examiner—John D. Lee
Assistant Examiner—Phan T. H. Palmer
Attorney, Agent, or Firm—Nixon & Vanderhye

[57] ABSTRACT

A semiconductor optical switching device comprises a passive optical input stage, a matrix stage and a passive optical output stage. The matrix stage incorporates active amplifiers, the switch as a whole being therefore part passive and part active. Control over the switching configuration is provided by electrical inputs to the amplifiers. The matrix stage guides optical signals in a direction transverse to optical signals propagating in the input or output stages. With this configuration, fixed change in direction of the optical paths available to optical signals propagating through the device are provided by splitters, combiners and total internal reflection mirrors.

6 Claims, 7 Drawing Sheets

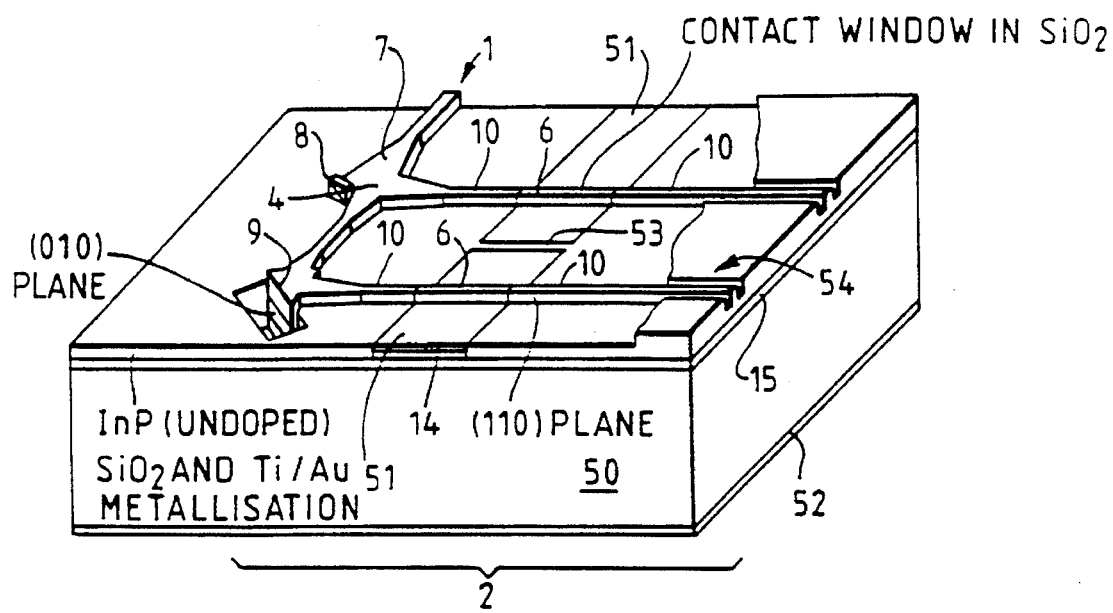
Fig. 5 1×2 OPTICAL SWITCH FABRICATION
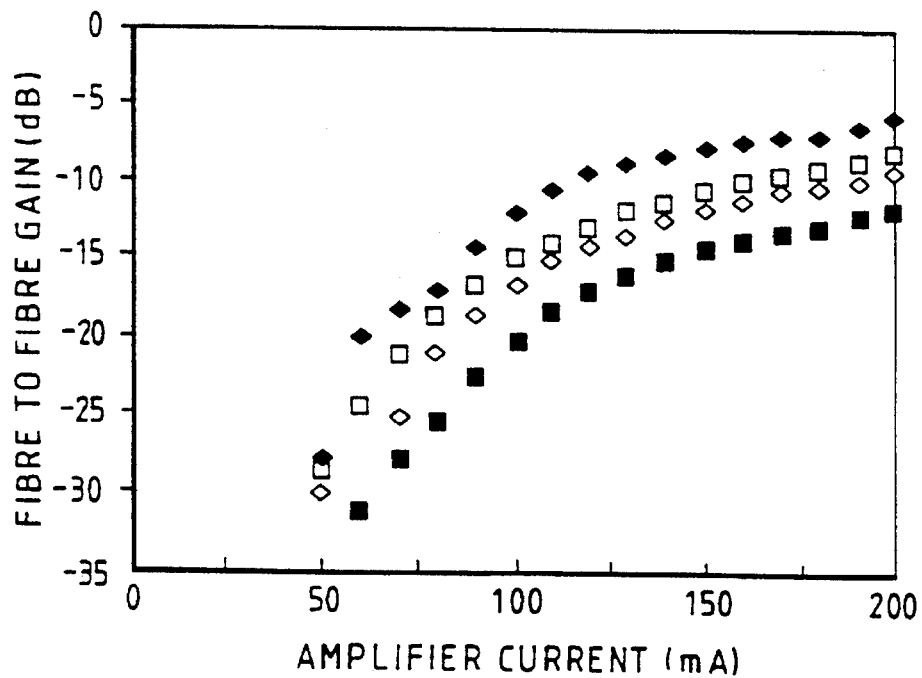
Fig. 6

Fig. 7a
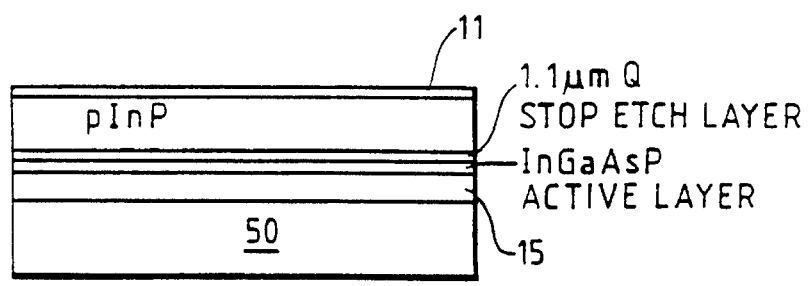
Fig. 7b
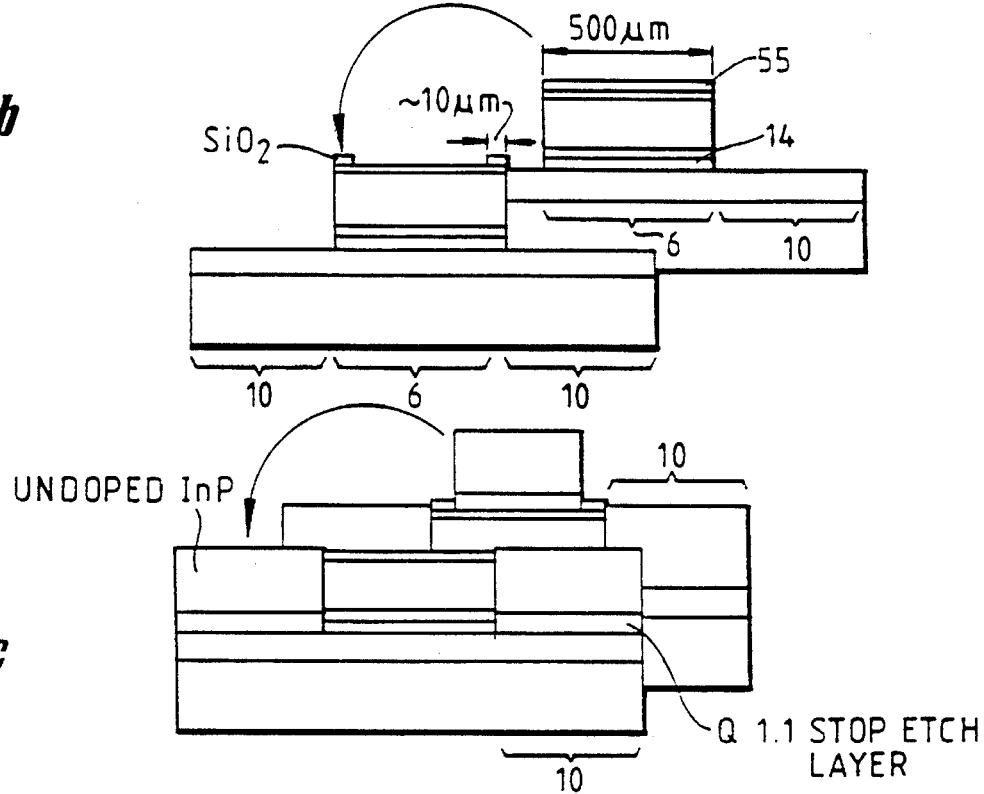
Fig. 7c
Fig. 7d
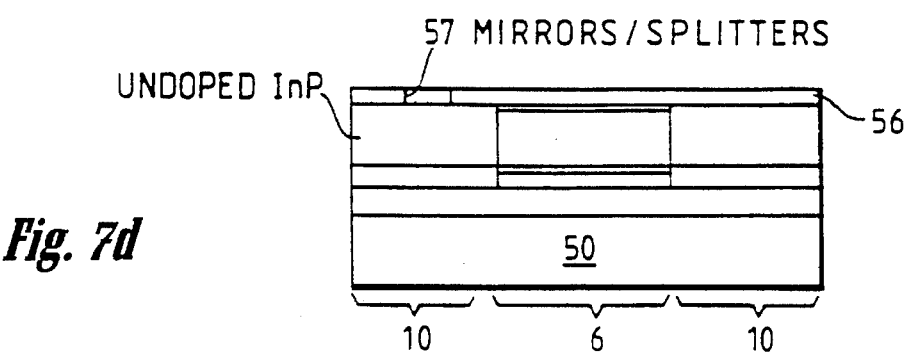

VERY LOW RIPPLE
80nm BANDWIDTH AT MAXIMUM GAIN CURRENT

| SWP 20nm/ | YS 5dB/RES.1nm | AVR 1 |
|---|---|---|
| WMKR | 1559.06 − 1480.10 = 78.96 | |
| LMKR | | |

OPTICAL SWITCHING DEVICE WITH PASSIVE INPUT AND OUTPUT STAGES AND ACTIVE AMPLIFIER IN A MATRIX STAGE

The present invention relates to an optical switching device and finds particular application in optical communications systems.

BACKGROUND OF THE INVENTION

Optical switching is expected to play an important role in future high capacity, for instance broadband, optical telecommunications networks. It is desirable to have all-optical switches in a communications network for several reasons, including the avoidance of a bit rate "bottleneck".

Optical switching can offer:
1. Large bandwidth.
2. Avoidance of interfaces with electronics, thereby requiring less equipment than for instance electronic switching.
3. No conversion to electrical form or re-shaping necessary.
4. High switching speeds.
5. Complex modulation schemes, coherent signals or packets of wavelengths can be switched without optical demultiplexing and multiplexing.
6. Avoids discrepancies between optical transmission rates and electronic processing speeds.
7. Potential for an optically transparent network (can accept a wide range of data rates).

The semiconductor laser amplifier gate switch array is an attractive component, offering potential for zero insertion loss, polarisation insensitivity, low wavelength dependence, low crosstalk, high extinction ratio, high switching speed and simple drive conditions. Small size and scope for integration are both important criteria for the practical realisation of optical switches. Switches are known, including a 2×2 switch with waveguided Y-branched input and output, and a 2×2 switch in which the Y-branching is replaced by reactive ion etched (RIE) total internal reflection (TIR) mirrors instead of the waveguided Y-branching.

Known devices of the prior art which have relevance to the present invention are described in the following published documents:

a) "Monolithically Integrated 2×2 InGaAsP/InP Laser Amplifier Gate Switch Arrays" by M. Janson et al, Proceedings of the 17th European Conference on Optical Communications, Post Deadline Papers, pp 28–30,
b) GB Patent Application number 2227854A, in the name STC plc, published 8th Aug. 1990.

The latter is entitled "Integrated Optics Asymmetric Y-Coupler" and provides a description of a fabrication technique for mirrors in optical semiconductor technology.

BRIEF DESCRIPTION OF THE INVENTION

According to the present invention, there is provided a semiconductor optical switching device comprising passive optical input and output stages, each having respectively a plurality of inputs and outputs, and a matrix stage, one or more inputs being selectively coupled to one or more outputs via The matrix stage to provide selective routing for optical signals input to the device, the material of the device in the matrix stage being at least in part active so that said selective routing can be controlled by control inputs to the matrix stage wherein the propagation direction of optical signals in both the input and output stages of the device is substantially the same, and said direction is substantially different from the propagation direction of optical signals in the active part of the matrix.

Thus, by providing that the input and output stages are in a substantially different direction to the active part of the matrix stage, switching devices according to the present invention have an architecture which can be relatively simply adapted to a differing number of input and/or output paths, and which is thus scalable.

The matrix stage can thus be set out between the input and output stages so that virtually any number of optical paths can be "picked off" from the input stage and selectively connected to any one of up to a large number of optical paths in the output stage. For instance, the matrix stage can be provided by optical paths lying generally transverse, for instance, at right angles, to the input and output stages. In the right-angled case, the input and output stages will be offset approximately by the length (in the direction of optical signals propagating in the matrix stage) of the matrix stage, though clearly other configurations might be applicable and advantageous.

Because switching devices according to embodiments of the present invention are part active and part passive, they can provide gain, thereby reducing insertion losses, while only simple drive conditions are required.

Embodiments of the present invention can provide a monolithically integrated amplifier gate switch matrix which provides a small device, compared with like devices of the prior art, and which introduces very low losses in use.

Preferably, changes in direction of propagation of optical signals following a single selected route in a device according to an embodiment of the present invention are provided by mirrors. By this means, the right angled configuration of the matrix stage with respect to the input and output stages referred to above can be provided. By getting away from what seems to be a widespread (optical) approach, in which optical paths are diverted as little as possible so that an incoming path tends to be gently branched and then continues in roughly the same direction, embodiments of the present invention can provide a device which is small, has passive input and output stages (being therefore less subject to faults for example losses and defects, than all-active devices), and is much more readily scalable in that the number of input and output lines are very easily multiplied up. Known devices do not provide this combination of advantages, and cannot provide the easy "scalability" at all.

BRIEF DESCRIPTION OF THE DRAWINGS

Embodiments of the present invention will now be described, by way of example only, with reference to the accompanying figures, in which:

FIG. 5 shows a perspective view of the arrangement of FIG. 2, further incorporating selective amplification stages coupled to said arrangement;

FIG. 6 shows a graph of fibre-to-fibre gain in each arm of a 2×2 switch according to an embodiment of the present invention;

FIGS. 7a–7h show fabrication steps involved in fabrication of an optical switch array according to an embodiment of the present invention;

DESCRIPTION OF THE PREFERRED EMBODIMENTS

Figure 1:
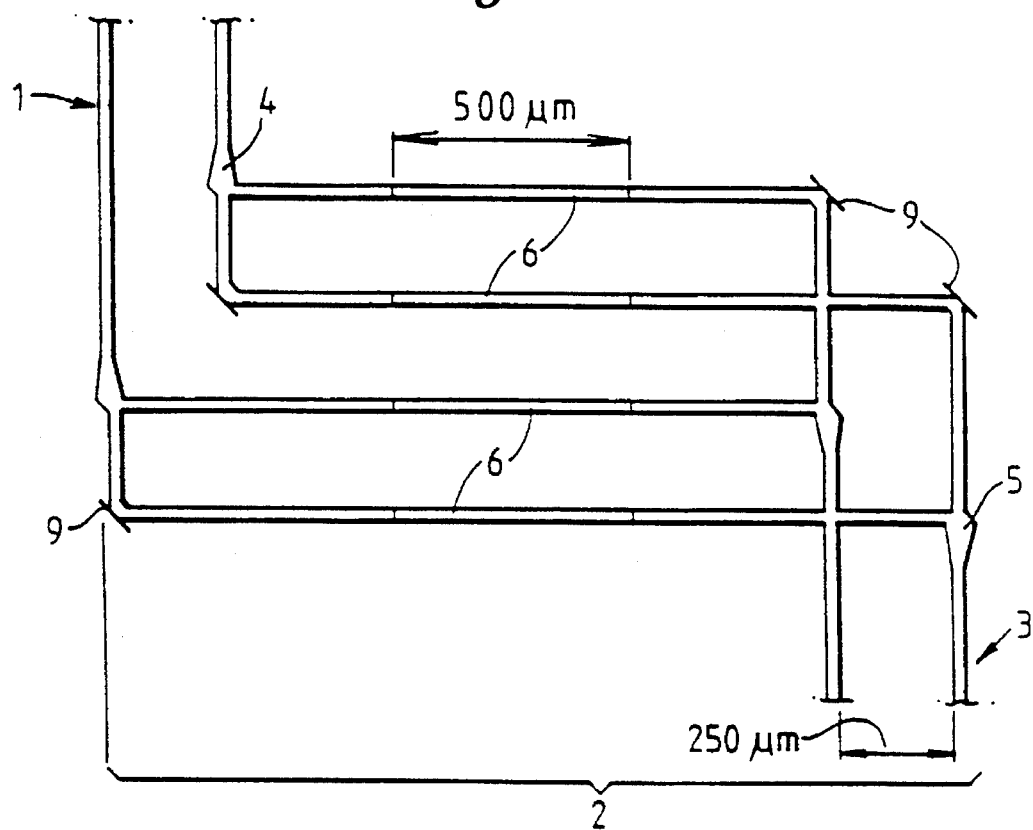
FIG. 1 shows a plan view of a 2×2 laser amplifier gate switch optical path layout according to an embodiment of the present invention.

Referring to FIG. 1, a path layout for a switching device according to an embodiment of the present invention incorporates an input stage 1, a matrix stage 2, and an output stage 3.

The device, shown schematically in FIG. 1, consists of 1×2 passive waveguide splitters 4 and combiners 5 integrated with an active section comprising four 500 μm long amplifiers 6. The signal is routed by gating the amplifiers 6 on or off to give gain or absorption respectively.

Figure 2:
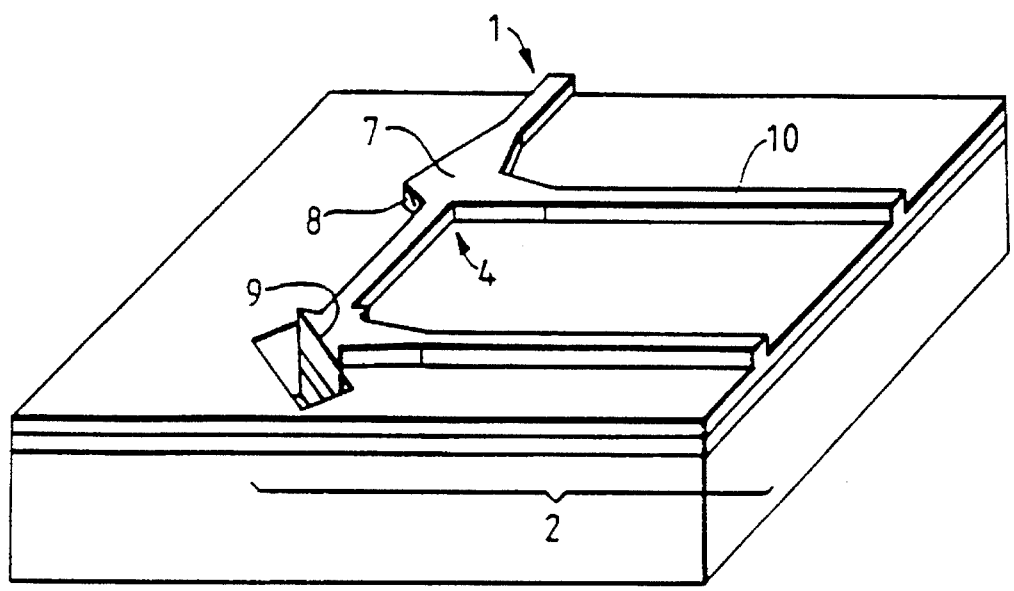
FIG. 2 shows a schematic diagram of a power splitter and a mirror arrangement for providing changes in propagation direction for optical signals propagating from input to matrix stages in a device according to an embodiment of the present invention.

The structure of the splitters 4 is shown more clearly in FIG. 2, from which the design principle for the splitters 4 is clear. Each splitter, shown in FIG. 2, incorporates a taper 7 to expand the beam horizontally followed by a TIR mirror 8 at 45° to the input 1 which reflects half of the light into a perpendicular arm having a passive section 10, with the other half transmitted undeflected to the mirror 9. The mirror 9 reflects all of remaining signal into the next passive section 10.

The dimensions of the device are 1 mm×2 mm but could be reduced for instance by shortening passive sections 10 of the path layout.

The separation between the two inputs and the two outputs of the input and output stages 1, 3 of the device shown in FIG. 1 is 250 μm, this is chosen so that standard telecommunications fibres can be coupled to the input and output stages.

Figure 3:
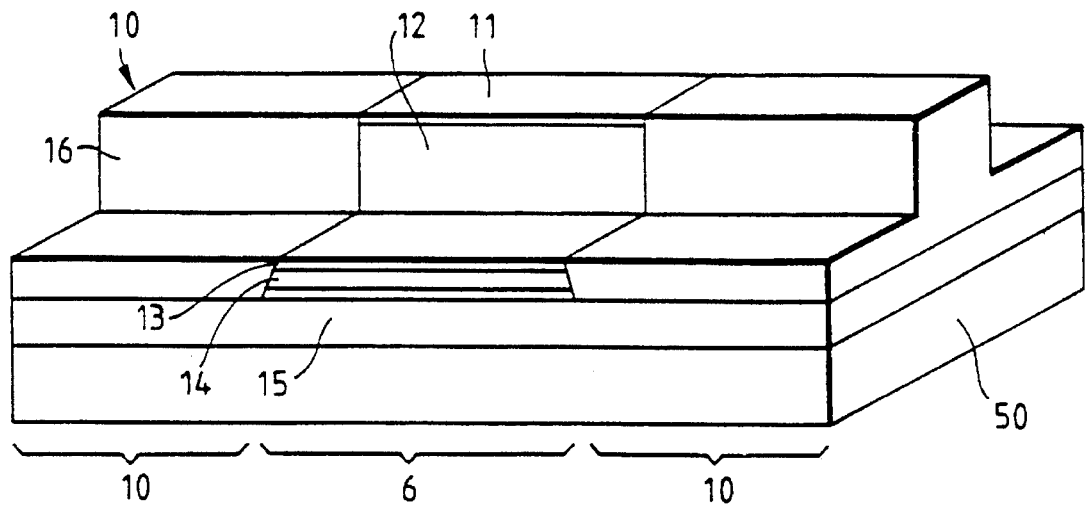
FIG. 3 shows a perspective view of a layer structure providing a passive-active interface for use in a matrix stage of a device according to an embodiment of the present invention.

The layer structure and integration scheme is shown in FIG. 3. The device operates at 1.55 μm, and all layers can be grown by MOVPE.

The amplifier section 6 of the device has the following structure. The device is based on an n-doped InP substrate 50. A guide layer 15, 0.4 μm thick, of InGaAsP material having a band gap equivalent wavelength $\lambda_g$ of 1.1 μm, is grown onto the substrate 50, again being n-doped. There is then an active layer 14, comprising 0.18 μm of InGaAsP, having a band gap equivalent wavelength $\lambda_g$ of 1.55 μm, undoped, followed by p-doped InGaAsP as a cladding layer 13. This cladding layer 13 has a band gap equivalent wavelength $\lambda_g$ again 1.1 μm and is followed by a second p-doped cladding layer 12, this time of InP, just under 1.9 μm thick, with an uppermost ternary contact layer 11, of p-doped InGaAs.

The passive sections 10 can be formed by etching the InGaAs contact layer 11, p-doped cladding layers 12, 13 and the active layer 14 down to the 0.4 μm InGaAsP guide layer 15, and then overgrowing with undoped InP 16.

This gives an active-passive coupling loss of 2 dB with a simple fabrication scheme, allowing the high yields necessary for large switch arrays. It also achieves a good interface with very low residual reflectivity which is essential for low gain ripple.

The lateral mode confinement is provided by a ridge-waveguide structure, formed by methane-hydrogen RIE (reactive ion etching). The mirrors 8, 9 are defined by a known technique such as the one described in GB patent application 2227854A, referenced above, with a self-aligned photolithography stage and RIE. P-metallisation is provided as an electrical contact pad (not shown) and channels are etched in the p-metallisation and the InGaAs contact layer 11 between the amplifiers to provide electrical isolation.

A number of devices as described above were antireflection coated and the fibre-to-fibre gain was measured for each device as a function of current for each of the four arms, using lensed fibres for input and output coupling. A fibre-to-fibre loss of 4 dB at an injection current of 200 mA was achieved for TE input polarisation, shown in FIG. 4. The fibre coupling losses account for 8–10 dB of the total loss, giving a facet-to-facet gain of typically 5 dB. The design should give the same loss in each arm, and the small differences were due to the fabrication process. The gain for TM polarisation was 4 dB lower but the polarisation sensitivity could be improved with changes to the layer structure. The optical bandwidth is typically 50–60 nm, with less than 1 dB gain ripple at 200 mA injection current. The passive sections 10 have a loss of 1–2 dB/cm and the TIR mirrors 8, 9 have an excess loss of 3–4 dB per facet. However, a mirror loss of 2 dB has been achieved for passive mirrors with improved etching techniques. The optical crosstalk between the channels was less than −45 dB, most devices showing less than 50 dB, with an on-off extinction ratio in excess of 45 dB and in most cases greater than 50 dB (unmeasurable). The amplifiers have a 200 μm separation giving a gain variation due to the Thermal interaction of less than 0.2 dB.

In summary, the above provides a compact 2×2 laser amplifier gate switch matrix with only 4 dB fibre-to-fibre loss, low crosstalk and high extinction ratio. Using TIR mirrors and active-passive integration there is established a technology suitable for fabricating large integrated switch arrays. Zero net fibre-fibre insertion loss is possible with further improvements in both the amplifying and passive sections 6, 10.

The above provides a description of the general structure of a switching device according to an embodiment of the present invention. Referring to FIG. 5, the coupling of the input stage 1 to a matrix stage 2 is shown in more detail for a 1×2 switch layout. The structure shown in FIG. 5 is substantially self-explanatory, being equivalent to that shown in FIG. 3 and discussed above, and the reference numerals used therein indicate features equivalent to those of FIGS. 1 to 3. It might be noted, however, that the electrical contact pads 51 to drive the amplifiers 6 are shown in place, together with the metallisation 52 to the exposed face of the substrate 50. The metallisation to the amplifier 6 is provided by SiO$_2$ and Ti/Au and shows the split 53 between the areas of metallisation for adjacent amplifiers 6.

There is also indicated an alternative ridge structure 54 for providing lateral confinement in the device, this being a double channel ridge structure 54, in place of the more simple ridge structures of FIG. 2.

A further fabrication aspect indicated in FIG. 5 is that the vertical sides of the ridge structures are provided by (110) planes in the InP materials while the TIR mirror 9 is provided by a (010) plane of material.

It might be noted that the FIG. 5 embodiment is equivalent to that of FIG. 2 in that the input 1 is aligned with the matrix stage 2 rather than being transverse thereto. The principles of fabrication are the same however.

Figure 4:
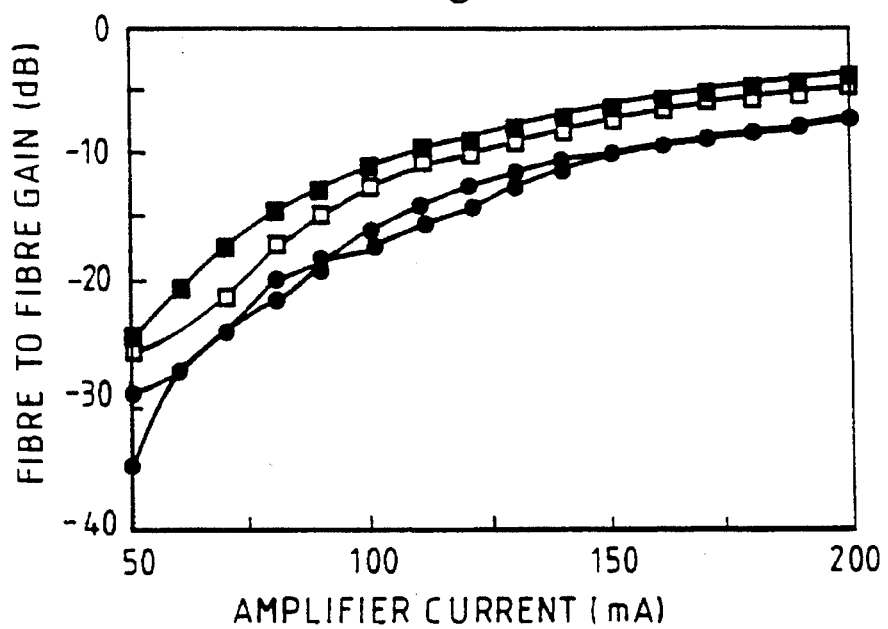
FIG. 4 shows a graph of fibre-to-fibre gain for each of four different optical paths through a 2×2 device according to an embodiment of the present invention, plotted against amplifier injection current supplied to the matrix stage thereof, at 20° C.

Referring to FIG. 6, fibre-to-fibre gain results in a 2×2 switch layout confirm the results shown in FIG. 4. (The devices providing the results in FIGS. 4 and 6 were different and it can be seen that the results of FIG. 4 showed improvement.)

Referring to FIGS. 7a–7h, a series of fabrication steps for achieving a suitable structure for use in a switch matrix according to an embodiment of the present invention incorporates known fabrication techniques, growth being carried out where relevant by metal-organic vapour phase epitaxy. The steps are indicated respectively in parts 1 to 8.

Figure 7E:
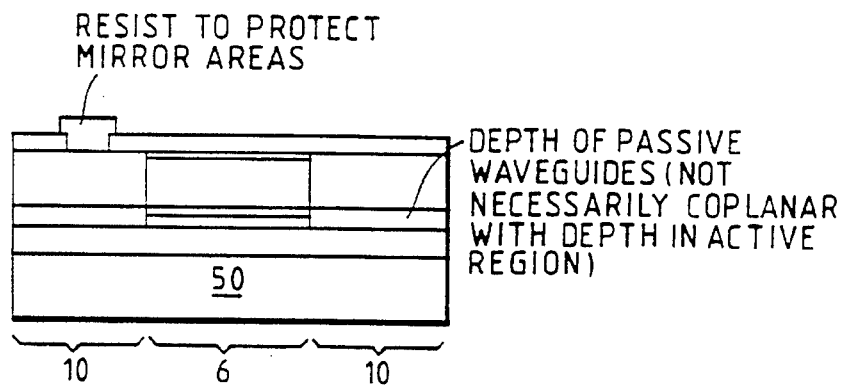
Figure 7F:
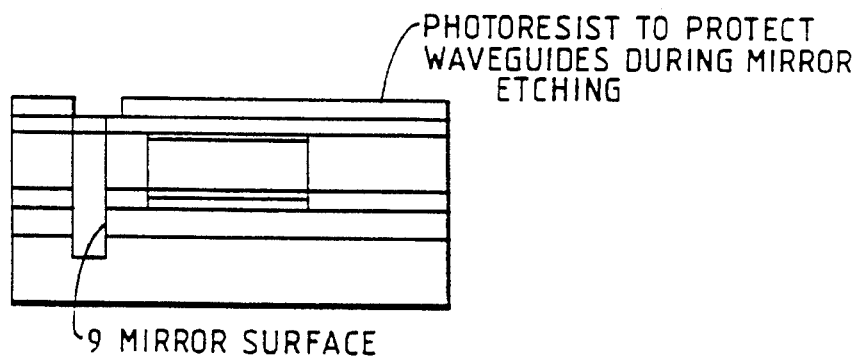

Referring to FIGS. 3, 5 and 7a–7h, but particularly to FIG. 7a, first of all the layers from the guide layer 15 through to the contact layer 11 are grown onto an InP substrate 50. In FIG. 7b, two options are shown for growing in the passive sections 10. In the first of these, $SiO_2$ 55 is put down in a strip 500 μm wide to establish the length of the amplifier regions 6. The layers are then etched away in the absence of the $SiO_2$ 55, in the passive regions 10. The second technique shown in FIG. 7b uses only thin strips of $SiO_2$, each 10 μm wide to define the ends of the amplifier region 6.

As shown in FIG. 7c, the layers of the passive waveguiding regions 10 are then grown in at either end of the amplifier region 6. Again, two alternative techniques are shown, these being to remove all the 500 μm length of $SiO_2$ 55, thus removing the InP polycrystalline material grown above the active Section 6, or to protect the material of the passive waveguiding regions 10 while the material over the amplifying regions is removed, both InP and $SiO_2$.

Figure 7G:
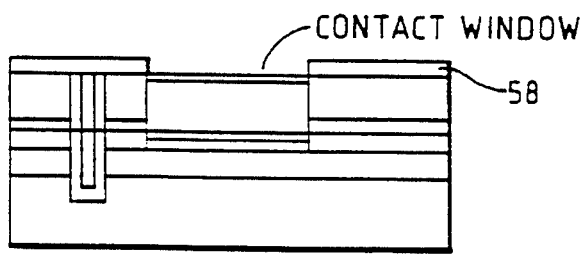
Figure 7H:
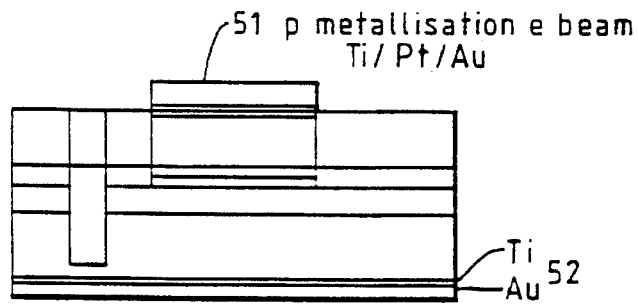

Referring to FIG. 7d, a continuous layer of $SiO_2$ 56 is then provided over the whole wafer and openings 57 created to define the mirrors 9 and splitters 4. These openings 57 are protected by resist during the stage shown in FIG. 7e, which is etching of the ridges to provide lateral confinement in the amplifiers 6 and passive waveguides 10. The depth of the ridges can be controlled by timing or by the use of a stop etch layer. The resist material protecting the openings 57 is then removed and photoresist put in place to protect the waveguides during mirror etching below the openings 57. Mirror etching is then carried out through the openings 57. This is followed, as shown in FIG. 7g by passivation and etching of contact windows, using $SiO_2$ as the passivating material 58.

Lastly the p metallisation 51 and the n metallisation 52 is put in place, with thinning as necessary, and the $SiO_2$ passivation material 58 is removed. The p metallisation might be put down by a known technique such as electron beam deposition of Ti/Pt/Au. The n metallisation might for instance comprise Au on a layer of Ti.

Alternatively, it might be preferred to use sputtered Ti/Au as the p metallisation, rather than the electron beam deposited layer described above.

It might be noted, in the above structure, the amplifier section 6 has a higher ridge structure than the passive waveguiding portions 10, this affecting the onset of higher order modes in known manner.

Figure 8A:
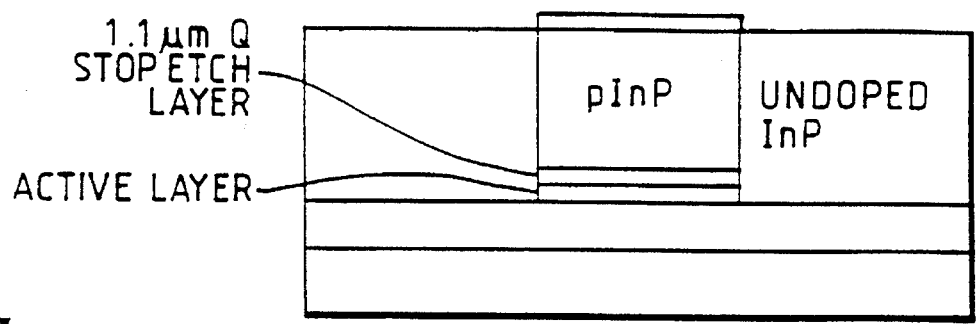
FIGS. 8a–8d show alternative active/passive structures for use in matrix stages of embodiments of the present invention.
Figure 8B:
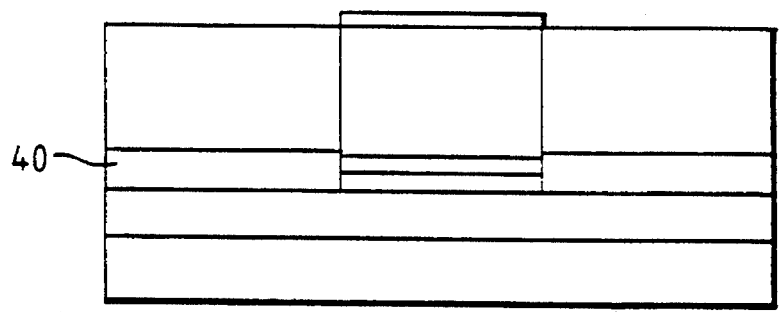
Figure 8C:
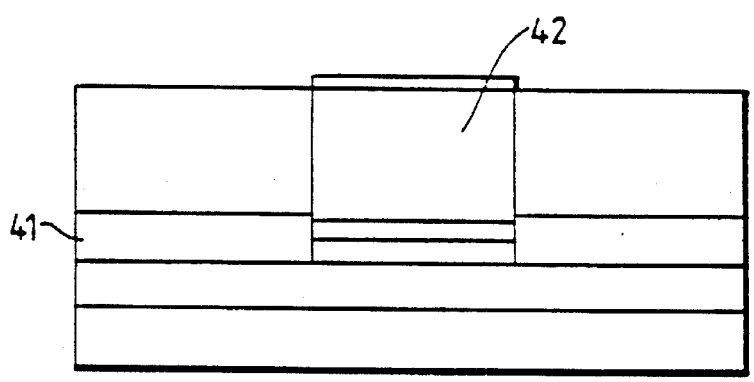
Figure 8D:
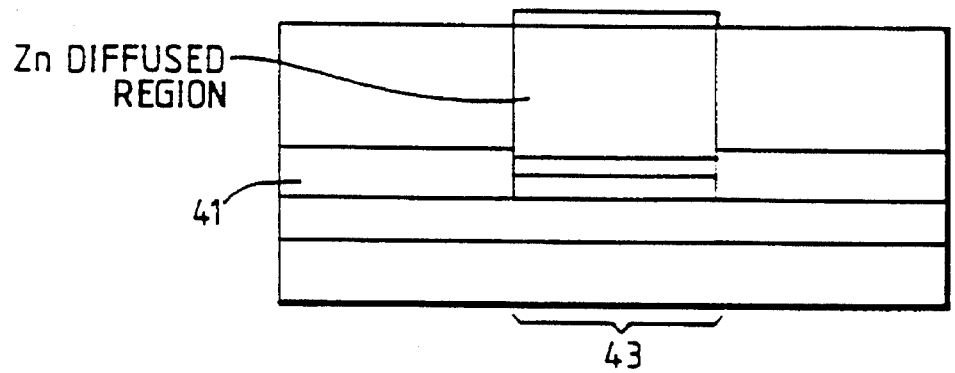

Referring to FIGS. 8a–8d, various structures might be used to achieve the switch matrix and these are set out in the figures, including incorporation of a stop-etch layer 40 to ease fabrication or of a 1.1 μm quaternary (Q) guide layer 41. The active/passive transition may be provided by "etched then buried" structure 42, as described with reference to FIGS. 7a–7e, or by a similar structure achieved instead by diffusion of zinc as a dopant into undoped InP, to form the active section 43 as shown in FIG. 8d.

The approach shown in FIG. 8c, using the guide layer 41, can provide better coupling efficiency at the active/passive interface, but might introduce growth irregularities.

In FIG. 8d, it might be noted that the material providing the active layer 14 of the amplifier region 6 will be etched away from the passive regions 10 prior to overgrowth with undoped InP, followed by the zinc diffusion step mentioned above.

(Reference numeral 43 in FIG. 8d is equivalent to reference numeral 6 in other Figures of this specification. It should also be noted that the structures shown in side view in the Figures, particularly FIGS. 7a–7h and 8a–8d, are not shown to scale, for instance the substrates 50 in practice being significantly thicker than the ridge depth.)

Figure 9:
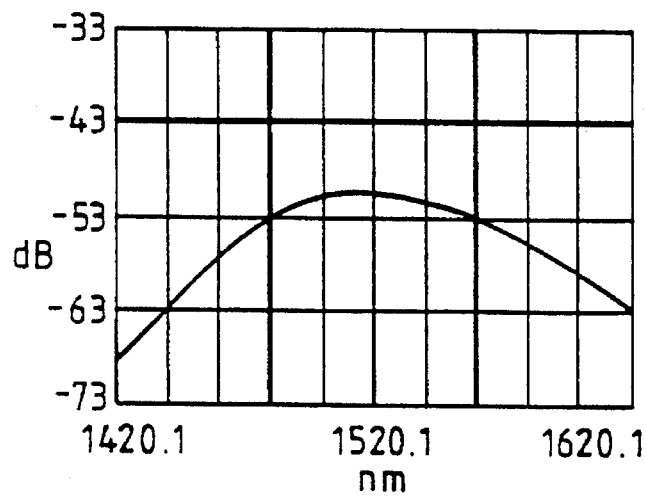
FIG. 9 shows a spontaneous emission spectrum for a device according to an embodiment of the present invention.

Referring to FIG. 9, measurements of the spontaneous emission spectrum of a switch matrix according to an embodiment of the invention, driven at an amplifying current of 170 mA, peaked at just below 1520.1 nm.

Referring again to FIG. 1, the basic principles of operation of a 2×2 optical switch are that it has two input waveguides 1 and two output waveguides 3. For each input, a signal may be routed to either of the two output arms 3, or broadcast to both outputs 3 simultaneously.

The input and output sections 1, 3 are passive waveguides, separated by a monolithically integrated optical amplifier section. Each input arm 1 is split in two by a 3 dB power splitter 4. The resulting four waveguides 10 are then coupled to optical amplifiers 6. Each of these amplifiers 6 may be turned on or off to gate the signal, providing gain when turned on and attenuation when off. This gives a high extinction ratio. The amplifiers 6 are then coupled to passive waveguides 10 and combined passively into the two output guides 3.

Changes in direction of the available optical paths through the switch, in addition to the splitters 4 and combiners 5, are provided by total internal reflection mirrors 9 to give a compact design.

Figure 10:
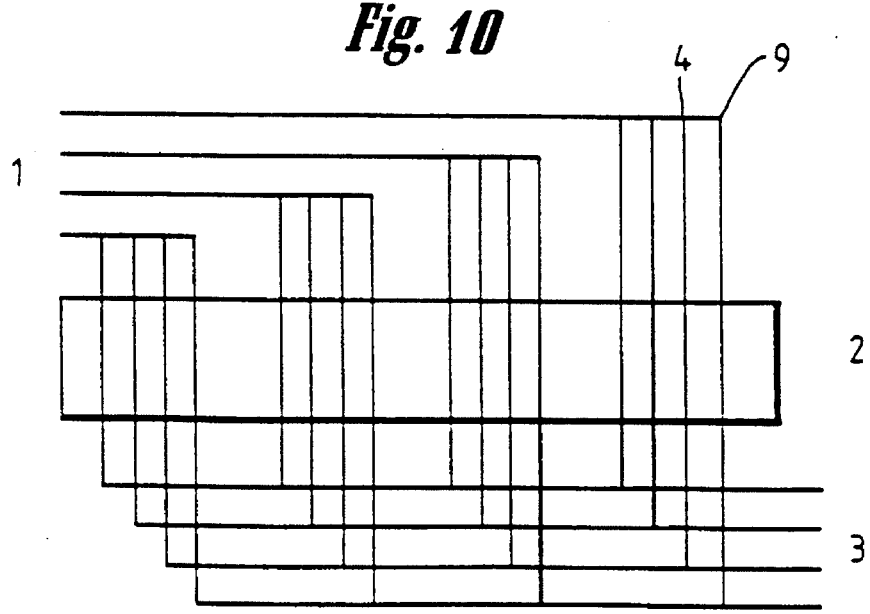
FIG. 10 is a schematic of a 4×4 switching device according to the present invention.

It should be noted that, as mentioned in the introduction to this patent specification, the general layout of switch matrices according to embodiments of the present invention lends itself to "multiplying up" such that multiple inputs (more than 2) can be selectively coupled to multiple outputs (more than 2) if required, providing a type of optical bus system. This is shown schematically in FIG. 10 for a 4×4 switching device. From FIG. 4 it can be seen that the architecture of the switching device is particularly suitable for scaling to larger switch arrays, thus each of the input paths in the passive input stage 1 can be easily split into four separate paths by the use of splitters incorporating mirrors, each of these separate paths pass through a common, easily fabricated, amplifying matrix stage 2, and are then easily combined to form four output paths 3 by combiners incorporating mirrors. The whole switching device thus remains compact and easy to fabricate when extended to larger numbers of inputs and outputs.

The number of inputs and number of outputs of a switching device can be significantly different, but in order to maintain full flexibility in switching any input to one or more output, each input path should be split into the number of separate paths corresponding to the number of outputs. The concept of the offset layout is very versatile in this respect. It is not essential of course that the angles involved are 90°, other angles possibly facilitating other configurations but retaining the offset layout.

We claim:

1. A semiconductor optical switching device comprising passive optical input and output stages, each having respectively a plurality of inputs and outputs, and a matrix stage, one or more inputs being selectively-coupled to one or more outputs via the matrix stage to provide selective routing for optical signals input to the device, the material of the device in the matrix stage being at least in part active so that said selective routing can be controlled by control inputs to the matrix stage wherein the propagation direction of optical signals in both the input and output stages of the device is substantially the same, and said direction is substantially different from the propagation direction of optical signals in the active part of the matrix.

2. A device according to claim 1, wherein the matrix stage is set generally at right angles to said input and output stages, said input and output stages being offset approximately by the length of said matrix stage, such that an optical signal input to the device propagates in the input stage in a first direction, is deflected through substantially 90° at the matrix stage, traverses an active region and subsequently is deflected back to said first direction, on leaving said matrix stage, and consequently propagates in the output stage in said first direction but offset with respect to its path in said input stage.

3. A device according to claim 2, wherein the input stage comprises n input paths, the output stage comprises m output paths, the matrix stage comprises n×m active parts and each input path is split into m separate paths before the matrix stage by m−1 splitters each incorporating a mirror, and each output path is formed from n separate paths after the matrix stage by n−1 combiners each incorporating a mirror.

4. A device according to claim 1, based on the III-V materials system.

5. A device according to claim 4, having an indium phosphide substrate.

6. A device according to claim 1, wherein changes in propagation direction of optical signals following a selected route in said device are provided at least principally by mirrors.

* * * * *